July 13, 1926.
C. E. BRODERS
1,591,960
MECHANICAL GEAR SHIFTER
Filed July 1, 1924      5 Sheets-Sheet 1
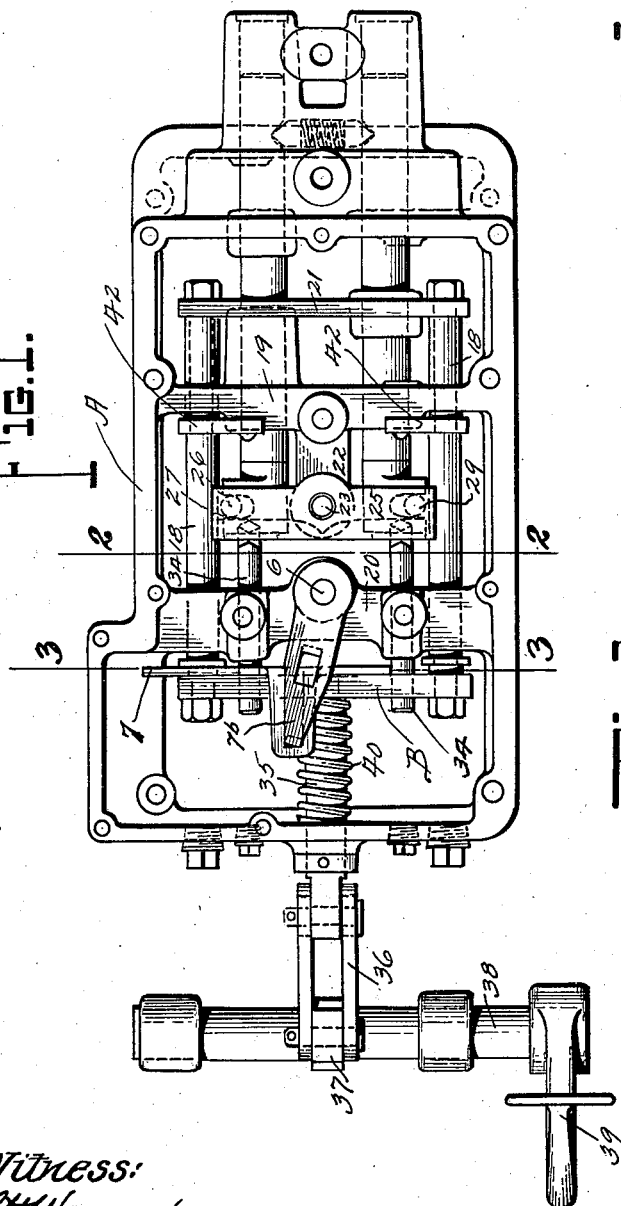
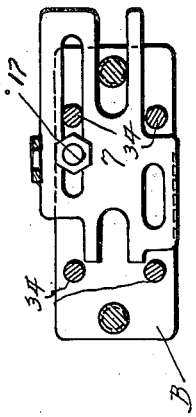
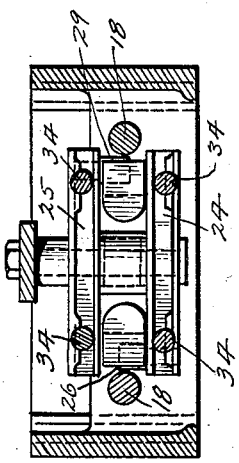
Inventor
C. E. Broders

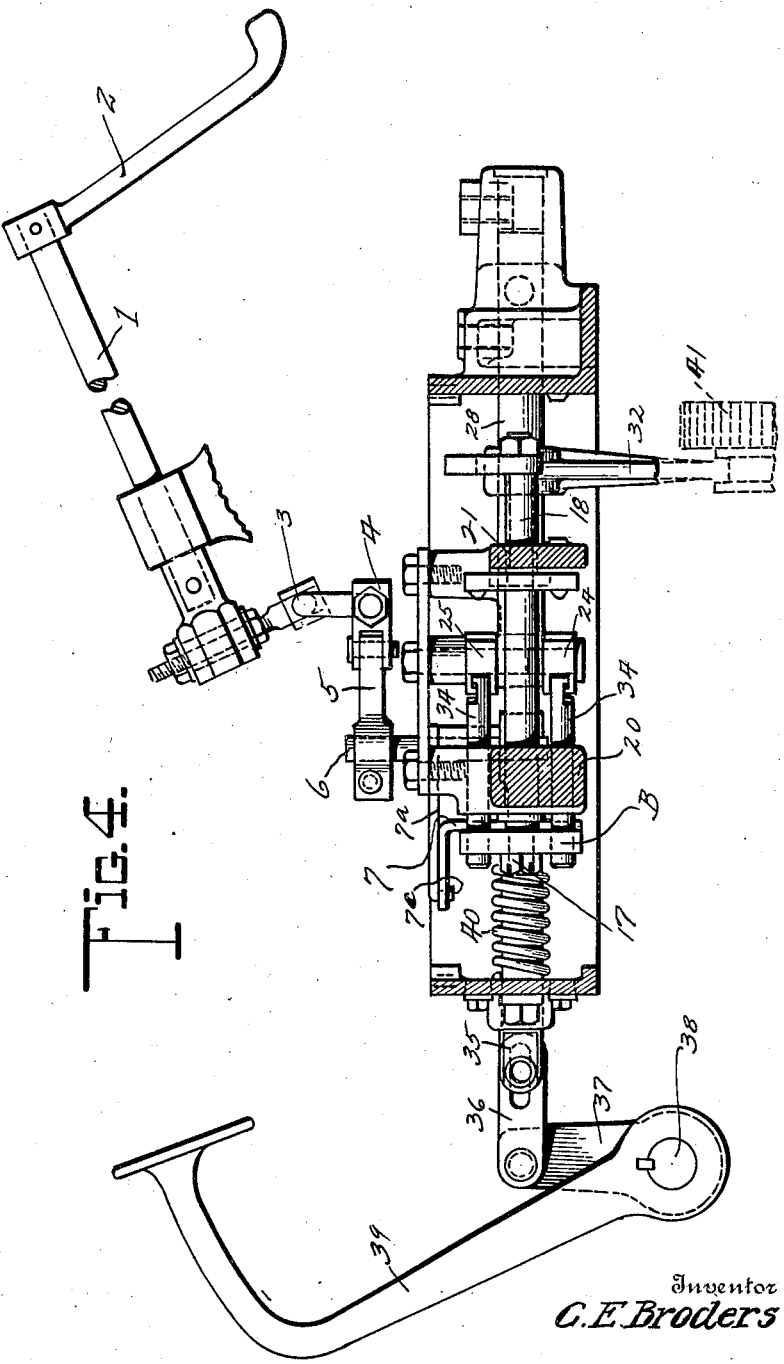

July 13, 1926.
C. E. BRODERS
1,591,960
MECHANICAL GEAR SHIFTER
Filed July 1, 1924
5 Sheets-Sheet 3
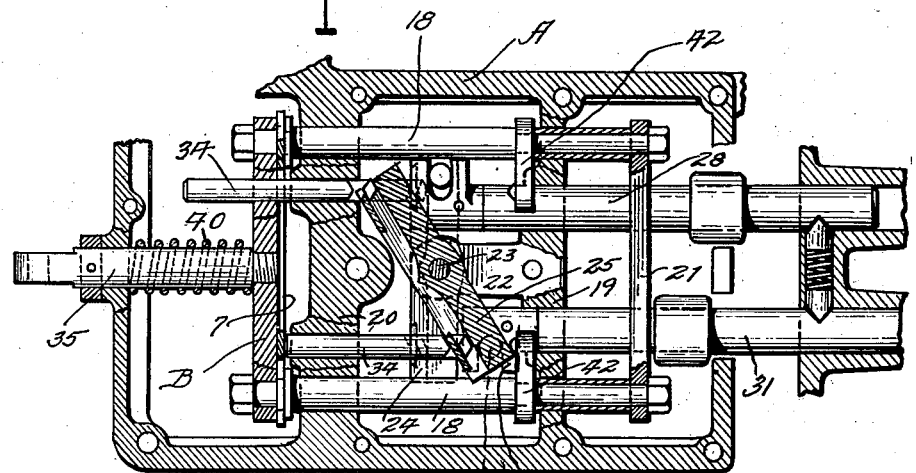
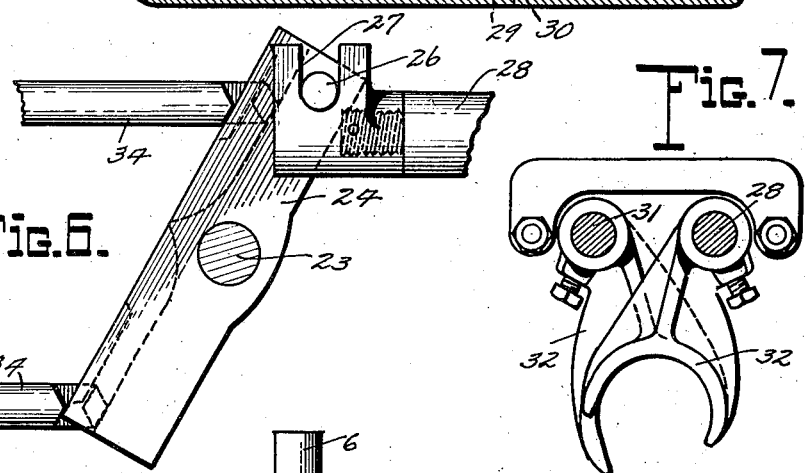
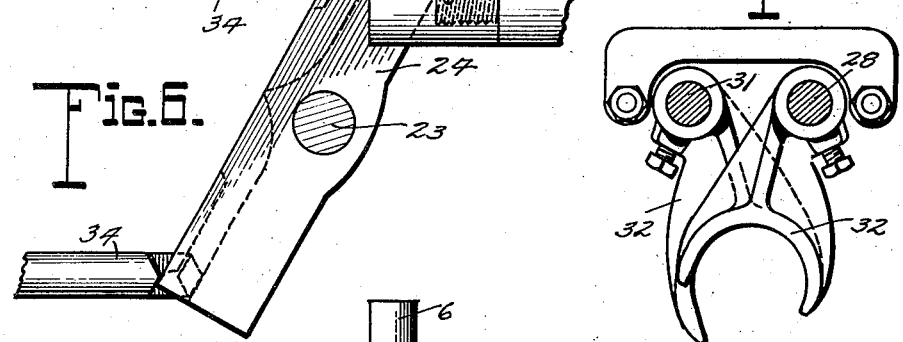
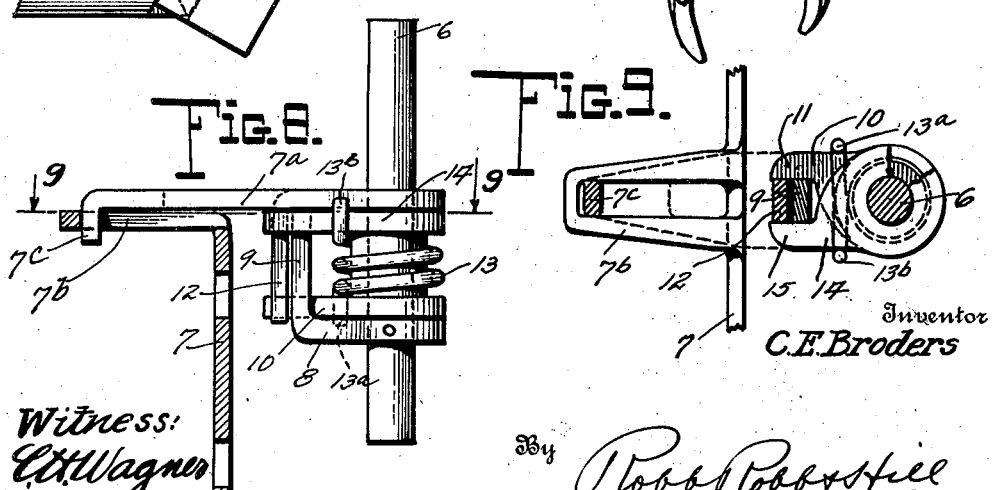

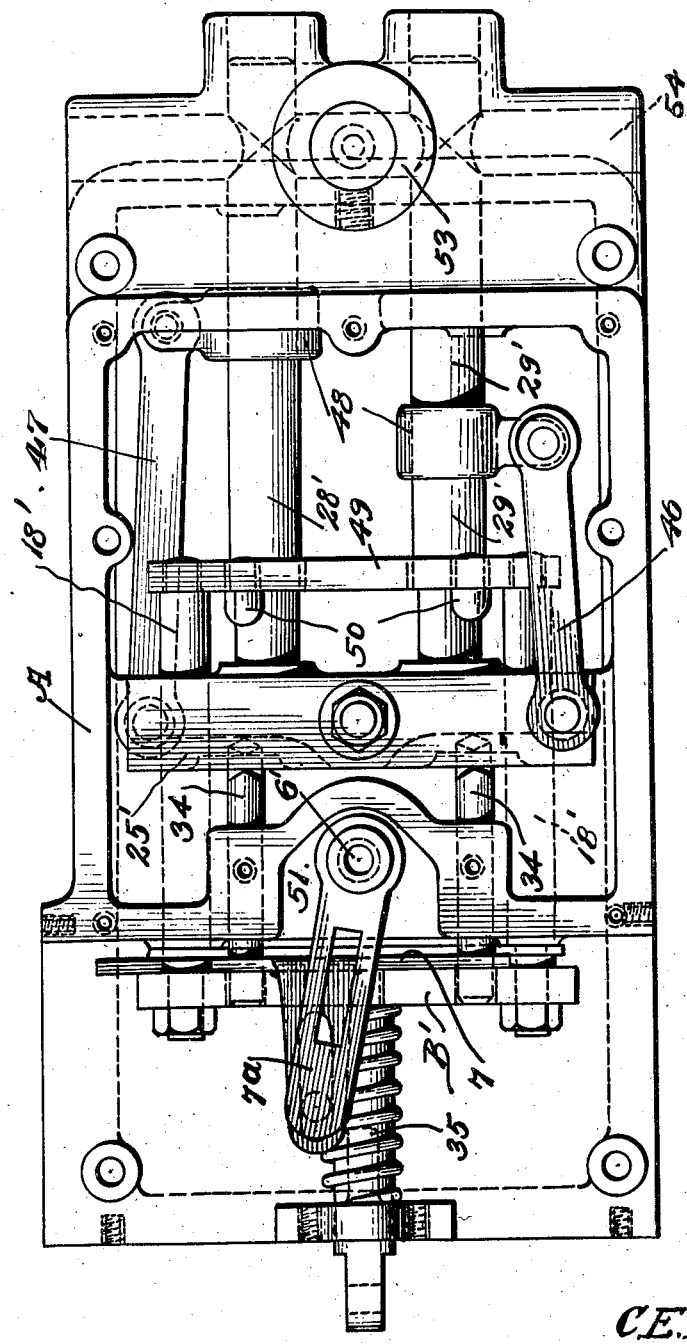

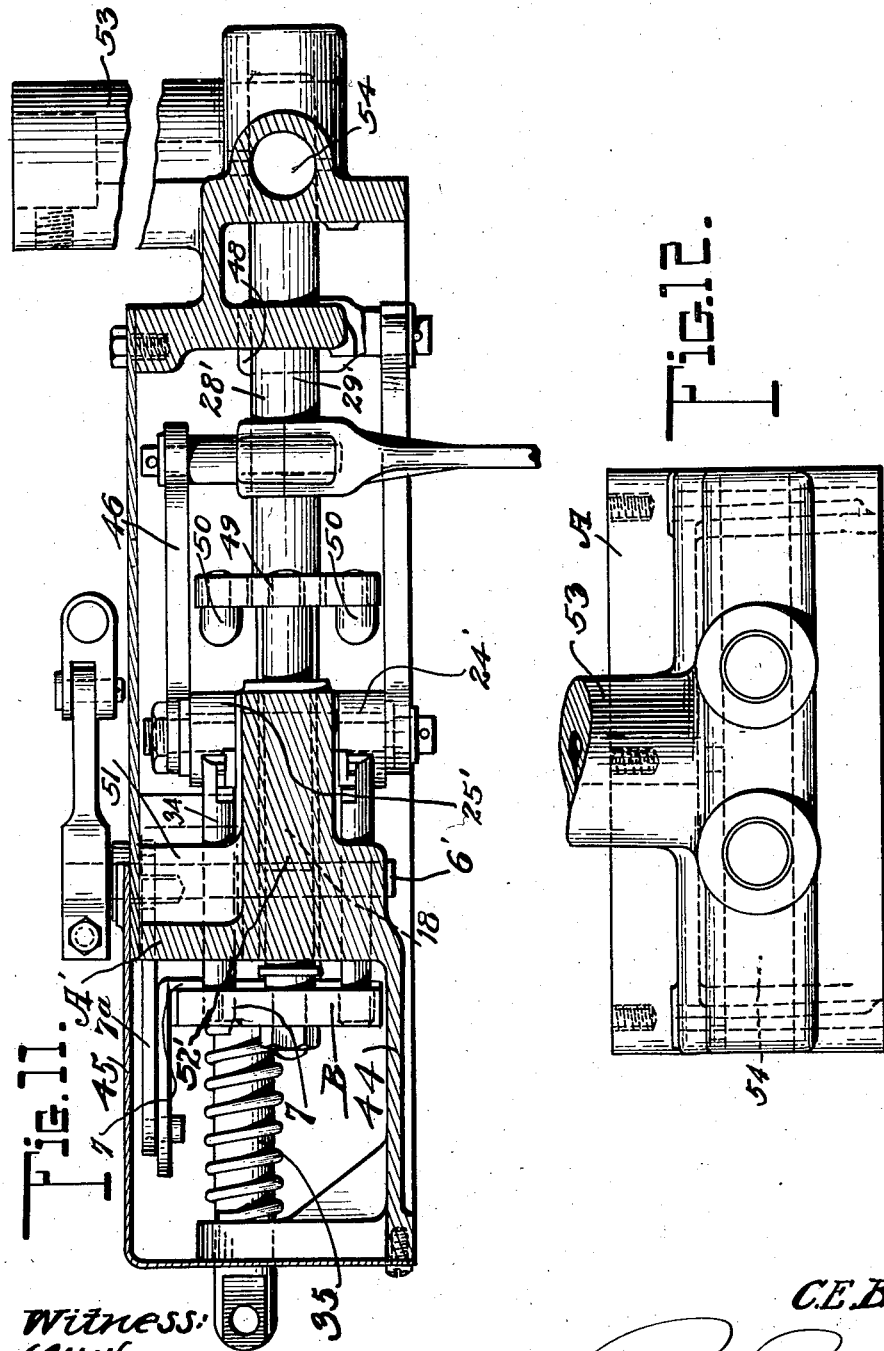

Patented July 13, 1926.

1,591,960

UNITED STATES PATENT OFFICE.

CLAUDE E. BRODERS, OF WALDO, WISCONSIN, ASSIGNOR TO UNITED STATES AUTOMATIC SHIFT COMPANY, OF MADISON, WISCONSIN, A CORPORATION.

MECHANICAL GEAR SHIFTER.

Application filed July 1, 1924. Serial No. 723,550.

The present invention embodies a construction of gear shift of the mechanical type exemplified by Laursen Patent No. 1,462,139, issued July 17, 1923.

The invention involves primarily a simplification of the construction of the shift disclosed by the said Letters Patent, whereby the device as a unit may be mounted on top of the transmission gear casing, and whereby the various operating parts of the device are reduced in number and rearranged to afford a considerable economy of space, while retaining the same general principles of operation.

In the accompanying drawings:

Figure 1 is a top plan view of the mechanical gear shifter comprising the novel features of the invention, the top plate removed to disclose the interior arrangement of parts.

Figure 2 is a cross-sectional view on the line 2—2 of Figure 1.

Figure 3 is a cross-sectional view on the line 3—3 of Figure 1 showing more particularly the mounting of the selector plate.

Figure 4 is a sectional view of a shift embodying the invention, the clutch pedal and selector control features being shown according to the general method of connection thereof.

Figure 5 is a fragmentary horizontal sectional view taken in a plane intersecting one of the shifter slide actuating levers.

Figure 6 is an enlarged fragmentary top plan view showing more clearly the connections between the actuating rods and the actuating lever, and the connection between such lever and one of the shifter slides.

Figure 7 is a sectional view bringing out more clearly the mounting of the shifting yokes on the shifting slides.

Figure 8 is a sectional view bringing out more clearly the elastic connection between the selector actuating arm and its operating means, and the selector plate connected with said arm.

Figure 9 is a sectional view taken about on the line 9—9 of Figure 8.

Figure 10 is a view similar to Figure 1 showing a modification of the invention.

Figure 11 is a view like Figure 4 illustrating the modification.

Figure 12 is an end view of the housing unit for the mechanical gear shift devices.

In view of the disclosure of the general principle of operation of my invention, and certain equivalent features of construction, by the Letters Patent above referred to, I do not deem it necessary to enter into an explanation of details of construction that will be self-evident to one versed in the art, on reference to the said patent.

It is notable that I use in my mechanical gear shift a selector control of any suitable type preferably including a selector shaft 1 to be located adjacent to the steering post of a motor vehicle and having a selecting arm 2 adapted to be held in any desired position of selection or preselection as known in this art. The shaft 1 is connected by a universal coupling 3 with a block 4 pivoted to an arm 5 rigidly secured to the vertical operating shaft 6 by which the selector plate 7 is operated. The connection between the selector plate 7 and the shaft 6 includes an operating arm 8, see Figures 8 and 9, which arm is rigidly attached to the shaft 6. The arm 8 has a vertical extension or member 9 above which is directly mounted an actuating palte 10 having a lug 11 engaging a vertical member 12 projecting downwardly from the selector plate actuating arm 7ª. The lug 11 engages one edge or side of the member 9 and one edge or side of the member 12 and a spring 13 coiled about the shaft 6 has a downturned end 13ª resiliently bearing against the parts 8 and 10. On the shaft 6 is also carried an actuating plate 14 like the plate 10 and having a lug 15 disposed opposite to the lug 11, in relation to the parts 9 and 12, and the spring 13 has an upturned end 13ᵇ resiliently bearing against the parts 14 and the selector plate operating arm 7ª.

The arm 7ª is loose on the shaft 6 and the arm 8 is fixed thereto as stated before, and the spring 13 in its cooperation with the parts just described establishes an elastic connection between the selector control features 1 and 2, and the selector plate 7 so that if the movement of the plate 7 is resisted when the members 1 and 2 are adjusted, and this resistance later removed, the spring 13 will act to cause shifting of the plate 7 according to a preselected positioning of the parts 1 and 2. The selector plate 7 has a lateral projection 7ᵇ which is slotted and which receives a downturn lug 7ᶜ on the actuating arm 7ª.

The selector plate 7 is mounted to reciprocate transversely upon a sliding head or frame mounted in the casing or housing A of the gear shift unit. The plate 7 comprises certain solid and cut away portions operating substantially as set forth in the patent previously identified and said plate is fastened against displacement from the sliding head which is generally designated at B, by means of a stem and nut device 17.

The sliding head comprises a cross-piece and spaced slide rods 18 projecting therefrom and movable slidably in partitions 19 and 20 formed in the casing A. The rods 18 are connected at the ends remote from the cross-piece above mentioned, to which the designation B is applied, by a cross plate 21. A lateral arm 22 projects from the partition 19 and is provided with an axis 23 on which are mounted coaxial superposed gear sliding operating levers 24 and 25. The lever 24 has an upstanding lug 26 at one end engaging in a notch 27 of the shifter slide 28. The lever 25 is provided at its opposite end with a downstanding lug 29 engaging in a notch 30 of the shifter slide 31.

The shifter slides 28 and 31 carry suitable gear shifting forks 32 which project downwardly therefrom into the housing of the transmission gearing as now usually found on automobiles, so that these forks may move the usual gears that are mounted to move for affecting the customary gear transitions, or holding the gears in positions rendering the transmission gearing neutralized.

Obviously, by moving either of the slides 28 and 31 in opposite directions, two gear transition actions of the gears controlled by said slide may be effected, in relation to the neutral position of said slide.

To move the slide 28 in two directions the lever 24 must be rocked in opposite directions, and for the same purpose in respect to slide 31 the lever 25 must be similarly rocked. To rock the levers 24 and 25 I use actuating rods 34 the arrangement of which is seen best in Figures 2 and 3. By adjusting the selector plate 7 to a proper selective adjustment I am enabled to cause a solid portion of said plate to abut with any one of the rods 34, whereupon by actuating the head or frame B a selected rod 34 will rock its lever, either 24 or 25, in a predetermined direction, and correspondingly actuate one of the slides 28 and 31.

In order to operate the head or frame B I provide an actuating rod or bar 35 screwed or otherwise attached thereto and attached and connected by links 36, see Figures 1 and 4, with an arm 37 on the clutch operating shaft 38 which carries the clutch control pedal 39. A spring 40 encircles the bar 35 between an end of the casing A and the head or frame cross-piece having the designation B applied thereto.

In operation my invention acts as follows:
A person driving an automobile equipped with the invention may at any time turn the selector arm 2 to a selecting position, such as for neutral, low, intermediate, high, or reverse, adjustments of the gears controlled by the forks 32, one of said gears being shown at 41 in Figure 4, in dotted lines. The above operation will cause movement of the selector shaft 1 and the member 8, and shift either one of the plates 10 or 14 depending upon which way the extension 9 of the arm 8 is moved. The spring 13 is thus placed under additional tension so that when the clutch pedal 39 is depressed to throw out the clutch the sliding head or frame B will be moved to the left as seen in Figures 1 and 5. Such movement of said head B causes neutralizing arms 42 on the rods 18 to abut with the levers 24 and 25 and restore them to neutral positions in which they are disposed at right angles to the rods 18 and parallel with the partitions 19 and 20 of the casing.

When the levers 24 and 25 have been thus neutralized, so to speak, the head B is so disposed that the lever actuating rods 34 and the selector plate 7 has assumed positions in which the selector plate is substantially free from abutment with any one of the rods 24. As soon as this abutment action of the selector plate 7 in relation to one of the rods 34, in which it has previously cooperated, ceases the said plate 7 which is under pressure from the resilient connection 13 is adapted to shift quickly cross-wise of the head B to its position determined by the preselecting action of the parts 1 and 2. The pressure on the clutch pedal 39 being now released the head B moves to the right as shown in Figure 5 and acts on one of the rods 34, as is illustrated in said figure, to rock the lever 25 and by so rocking said lever the gear shifting rod 31 is moved in a rightward direction. Obviously, operation of the lever 25 to rock it in an opposite direction would move the slide 31 to the left from neutral. The action of the shift rod or bar 28 will be self evident from the foregoing. If desired the spring 40 may be dispensed with and the usual clutch spring employed as the sole means for returning the head B to its normal position as shown in Figures 1 and 4.

I now describe the modification shown in the Figures 10 to 12 of the drawings. In the modified adaptation of my invention I rearrange certain connections and utilize different connections between the actuating levers for the gear shifting slides, and said slides, the connections not requiring as great a degree of angular movement of the levers, and the parts actuated thereby, as required in the first described construction. I also simplify the formation of my casing or housing which encloses the parts of my shifting unit, and am enabled to foreshorten said housing and render more compact various parts in the manner that will be readily seen. I shall not repeat the description of those parts of my device of Figures 10 to 12 inclusive, which are substantially like the parts previously set forth. I note, however, that the shifting unit casing as regards its cast construction is provided with an end A' from which extends off a ledge 44 above which the cross-piece B' of the slide head or frame, the selector plate 7, and the member 35 are disposed, being preferably housed by a sheet metal housing plate or cover 45. The slide shifting levers 24' and 25' are actuated much the same as before but they are connected by links 46 and 47 respectively with couplings 48 one of which is attached to each of the slides 28' and 29'. By the above construction I am enabled to use a neutralizing plate 49 carried by the right hand ends of the slide or guiding rods 18' said neutralizing plate being equipped with four lugs 50 which abut with the levers 24' and 25' in the neutralizing action. The end wall A' of the casing of the unit has a recess 51 in which the shaft 6' is mounted at its upper end said shaft passing through a solid portion 52' beneath said recess to obtain a suitable bearing. The recess 51 affords ample space for the elastic and resilient connection feature between the shaft 6' and the arm 7ª that acts directly upon the selector plate.

It will be observed that I have largely omitted the transmission lock and pawls in my ilustrations as these features are immaterial to the invention.

With the rearrangement of the operating parts according to the present invention my shifter unit may be mounted above and directly attached at such place to the transmission casing of an automobile and as so disposed avoids the necessity of establishing external connections at one side of the unit casing, which connections are attached to the gears of the transmission, and make for difficulties in the arrangement and connecting up of my invention with the main gear mechanism of the machine.

The formation of the end wall A' is such as to facilitate the accurate reaming and the necessary machine work for the various slide holes or openings formed in said end wall. While I have not illustrated a transmission lock at the rear end of the casing said lock would be located in the vertical boss 53. Likewise, the locking pawls for the gear shifting slides 28' and 29' would be mounted at the rear end of the casing in the openings 54 provided therefor.

The peculiar design of my casting for the casing enables me to employ a cover of sheet metal just forward of the horizontally swinging levers. And the front end of the shift unit is protected by the dust housing plate or cover previously mentioned. The movement of the reciprocating head B' is limited by the finished bosses designated hereinbefore as the solid portions 52. In this construction the swinging levers 24' and 25' have been somewhat elongated and the angularity of their throw materially reduced so that all possibility of undue friction between the sliding parts and the portions of the casing in which they are operating is obviated.

Having thus described my invention what I claim as new and desire to secure by Letters Patent is:

1. In a mechanical gear shifter, in combination, a shifter casing, a sliding head mounted in said casing, clutch operated means connected with said head for moving the same, a pair of shifting levers rockably mounted in the casing transversely to said head, actuating rods for rocking said levers in opposite directions, a selector part carried by the head and adapted to be selectively placed in cooperation with any one of said rods, gear shifting slides mounted on said casing, operative connections between said slides and said levers, and selector control means for operation of the selector part above mentioned.

2. In a mechanical gear shifter, in combination, a casing, a head slidably mounted in said casing and comprising cross-pieces, and guide rods connecting said cross-pieces, gear slides, gear slide shifting levers coaxially pivoted transversely of said head and intermediate its ends and wholly housed within said casing, a selector part mounted on said head, with means for operating said part to preselect a certain gear transition, means intermediate the selector part and said levers for rocking the latter in opposite directions, and clutch operating means connected with said head to reciprocate the same.

3. In a mechanical gear shifter, in combination, a casing, a head slidably mounted in said casing and comprising cross-pieces, and guide rods connecting said cross-pieces, gear-slides, gear slide shifting levers coaxially pivoted transversely of said head and intermediate its ends and wholly housed within said casing, a selector part mounted on said head, with means for operating said part to preselect a certain gear transition, means intermediate the selector part and said levers for rocking the latter in opposite directions, and clutch operating means connected with said head to reciprocate the same, and neutralizing elements carried by one of the cross-pieces of the head for engaging and neutralizing the levers.

4. In a mechanical gear shifter, in combination, a casing, a head slidably mounted in said casing and comprising cross-pieces, and guide rods connecting said cross-pieces, gear slides, gear slide shifting levers coaxially pivoted transversely of said head and intermediate its ends and wholly housed within said casing, a selector part mounted on said head, with means for operating said part to preselect a certain gear transition, means intermediate the selector part and said levers for rocking the latter in opposite directions, and clutch operating means connected with said head to reciprocate the same, and links one connecting each lever with an associated gear slide.

5. A mechanical gear shifter, in combination, a casing, a head slidably mounted in said casing and comprising cross-pieces, and guide rods connecting said cross-pieces, gear slides, gear slide shifting levers coaxially pivoted transversely of said head and intermediate its ends and wholly housed within said casing, a selector part mounted on said head, with means for operating said part to preselect a certain gear transition, means intermediate the selector part and said levers for rocking the latter in opposite directions, and clutch operating means connected with said head to reciprocate the same, and links one connecting each lever with an associated gear slide, said links being arranged in substantially parallel relation with the slides, together with neutralizing elements mounted on one of the cross-pieces of the head for restoring the levers in neutral positions on reciprocation of the head.

6. In a mechanical gear shift, a selector, an operating device therefor, and a connection intermediate said parts comprising a shaft, an arm fixed to the shaft and having an operating projection, a spring pressed plate loose on the shaft and engaging said projection at one side, a second spring pressed plate engaging said projection and engaging the arm at the other side, and a selector actuating arm having a part engaged between said plates.

7. In a mechanical gear shift, a selector, an operating device therefor, and a connection intermediate said parts comprising a shaft, an arm fixed to the shaft and having an operating projection, a spring pressed plate loose on the shaft and engaging said projection at one side, a second spring pressed plate engaging said projection and engaging the arm at the other side, and a selector actuating arm having a part engaged between said plates, and a pin and slot connection between said selector actuating arm and the selector.

8. In a mechanical gear shift, a selector, an operating device therefor, and a connection intermediate said parts comprising a shaft, an arm fixed to the shaft and having an operating projection, a spring pressed plate loose on the shaft and engaging said projection at one side, a second spring pressed plate engaging said projection and engaging the arm at the other side, and a selector actuating arm having a part engaged between said plates, and a pin and slot connection between said selector actuating arm and the selector, and a spring encircling said shaft and having opposite and oppositely pressing ends that engage the said plates to give them spring pressing action, the selector actuating arm being mounted on the said shaft.

In testimony whereof I affix my signature.

CLAUDE E. BRODERS.